(12) United States Patent
Tsai

(10) Patent No.: US 9,871,477 B2
(45) Date of Patent: Jan. 16, 2018

(54) MOTOR SPEED CONTROL CIRCUIT AND CONTROL METHOD THEREOF

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 126 days.

(21) Appl. No.: 14/936,694

(22) Filed: Nov. 10, 2015

(65) Prior Publication Data
US 2017/0025976 A1  Jan. 26, 2017

(30) Foreign Application Priority Data
Jul. 22, 2015  (TW) .............................. 104123715 A

(51) Int. Cl.
*H02P 7/29* (2016.01)
*G05D 23/19* (2006.01)
*G06F 1/20* (2006.01)

(52) U.S. Cl.
CPC ...................................... *H02P 7/29* (2013.01)

(58) Field of Classification Search
CPC ...... H02P 8/00; H02P 4/00; H02P 7/00; H02P 27/00; H02P 6/187; F04D 27/004; G06F 1/20; H03K 7/00
See application file for complete search history.

(56) References Cited

U.S. PATENT DOCUMENTS

| 6,373,320 B1* | 4/2002 | Musiol | H03F 1/302 |
| | | | 327/478 |
| 7,012,400 B2* | 3/2006 | Yu | H02P 7/288 |
| | | | 318/461 |
| 2004/0247449 A1* | 12/2004 | Ma | F04D 27/004 |
| | | | 318/400.01 |

(Continued)

FOREIGN PATENT DOCUMENTS

| CN | 104221273 A | 12/2014 |
| TW | 200603528 A | 1/2006 |

(Continued)

*Primary Examiner* — Eduardo Colon Santana
*Assistant Examiner* — Said Bouziane
(74) *Attorney, Agent, or Firm* — Li&Cai Intellectual Property (USA) Office

(57) ABSTRACT

A motor speed control circuit including a voltage-dividing module, a first analog-to-digital converter, a second analog-to-digital converter and an operation module. The voltage-dividing module includes a first resistor unit and a second resistor unit. The first analog-to-digital converter receives a supply voltage and converts the supply voltage into a digital supply voltage. The second analog-to-digital converter receives a divided voltage generated by the voltage-dividing module, and converts the divided voltage into a digital divided voltage. The divided voltage is associated with a resistance ratio between the first resistor unit and the second resistor unit. The operation module receives the digital divided voltage and determines a motor speed curve according to the resistance ratio. The operation module generates a first pulse width modulation signal according to the motor speed curve and the digital supply voltage to drive a motor.

10 Claims, 7 Drawing Sheets

(56) References Cited

U.S. PATENT DOCUMENTS

| | | | | |
|---|---|---|---|---|
| 2010/0033113 A1* | 2/2010 | Maruyama | ......... | H05B 33/0812 |
| | | | | 315/309 |
| 2010/0176851 A1* | 7/2010 | Jiang | ........................ | H03K 7/08 |
| | | | | 327/115 |
| 2010/0327792 A1* | 12/2010 | Huang | ................... | G01K 13/00 |
| | | | | 318/471 |
| 2012/0007526 A1* | 1/2012 | Tsai | ......................... | H02P 7/29 |
| | | | | 318/3 |
| 2013/0015795 A1* | 1/2013 | Lee | ......................... | H02P 6/06 |
| | | | | 318/400.13 |
| 2014/0169982 A1* | 6/2014 | Li | ........................ | F04D 27/004 |
| | | | | 417/14 |
| 2015/0155805 A1* | 6/2015 | Iwaji | ....................... | H02P 21/18 |
| | | | | 318/400.33 |

FOREIGN PATENT DOCUMENTS

| | | |
|---|---|---|
| TW | M344683 U | 11/2008 |
| TW | M3858867 U1 | 8/2010 |
| TW | 201304392 A1 | 1/2013 |

* cited by examiner

MOTOR SPEED CONTROL CIRCUIT AND CONTROL METHOD THEREOF

BACKGROUND

1. Technical Field

The present invention generally relates to a motor speed control circuit, more particularly, to a motor speed control circuit and a control method thereof, capable of adjusting a motor speed according to a plurality of motor speed curves.

2. Description of Related Art

With the development of technology, motors to run fans to cool computers have become indispensable electronic devices in this information society. Common motors such as direct-current (DC) motors, alternating-current (AC) motors, stepper motors, etc., have been widely used to drive the fans.

For a general motor, the higher the voltage supplied to the motor, the higher the rotational speed of the motor. The lower the voltage supplied to the motor, the lower the rotational speed of the motor. In other words, the voltage supplied to the motor is proportional to the rotational speed of the motor.

However, as the development of motor-based products gets more and more diverse, the design of motors has to be changed. For example, a general computer and a power-saving computer are equipped with different motors operating according to different motor speed curves. The motor installed in the general computer starts to operate upon receiving the voltage, while the motor installed in the power-saving computer starts to operate after the input voltage increases to a predetermined value.

Therefore, there is a need in providing a motor control circuit, capable of adjusting a motor speed curve based on different products, to drive the motor to rotate.

SUMMARY

One embodiment of the present invention provides a motor speed control circuit. The motor speed control circuit includes a voltage-dividing module, a first analog-to-digital converter, a second analog-to-digital converter and an operation module. The voltage-dividing module includes a first resistor unit and a second resistor unit. A first terminal of the first resistor unit receives a supply voltage. A first terminal of the second resistor unit is coupled to a second terminal of the first resistor unit. The first analog-to-digital converter is coupled to a first terminal of the first resistor unit, for receiving the supply voltage. The second analog-to-digital converter is coupled to a first terminal of the second resistor unit. The operation module is coupled to the first analog-to-digital converter and the second analog-to-digital converter. The first analog-to-digital converter receives a supply voltage and converts the supply voltage into a digital supply voltage. The second analog-to-digital converter receives a divided voltage generated by the voltage-dividing module and converts the divided voltage into a digital divided voltage. The divided voltage is associated with a resistance ratio between the first resistor unit and the second resistor unit. The operation module receives the digital divided voltage and determines a motor speed curve according to the resistance ratio. The operation module generates a first pulse width modulation signal according to the motor speed curve and the digital supply voltage to drive a motor. The motor speed curve is associated with the supply voltage and a rotational speed of the motor.

One embodiment of the present invention further provides a control method for adjusting a rotational speed of a motor. The control method is used for a motor speed control circuit. The motor speed control circuit includes a voltage-dividing module, a first analog-to-digital converter, a second analog-to-digital converter and an operation module. The control method includes the steps herein. In Step A, a supply voltage is received. In Step B, the voltage-dividing module divides the supply voltage to generate a divided voltage. The divided voltage is associated with a resistance ratio between a first resistor unit and a second resistor unit of the voltage-dividing module. In Step C, the supply voltage is converted into a digital supply voltage and the divided voltage is converted into a digital divided voltage. In Step D, the digital divided voltage is received so that the operation module determines a motor speed curve according to the resistance ratio. In Step E, a first pulse width modulation signal is generated according to the motor speed curve and the digital supply voltage to drive a motor. The motor speed curve is associated with the supply voltage and the rotational speed of the motor.

As stated above, one embodiment of the present invention provides a motor speed control circuit and a control method thereof, capable of selecting from motor speed curves according to practical demand and adjusting a rotational speed of a motor according to the selected motor speed curve. Moreover, the motor speed control circuit of the present invention using digital calculations outperforms the conventional motor control circuit using analog calculations to control the motor more precisely.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure.

While such terms as "first," "second," "third" etc., may be used to describe various components, such components must not be limited to the above terms. The above terms are used only to distinguish one component from another. For example, a second component may be referred to as a first component within the scope of the present invention, and similarly, the first component may be referred to as the second component. As used herein, the term "and/or" includes any and all combinations of one or more of the associated listed items.

Figure 1:
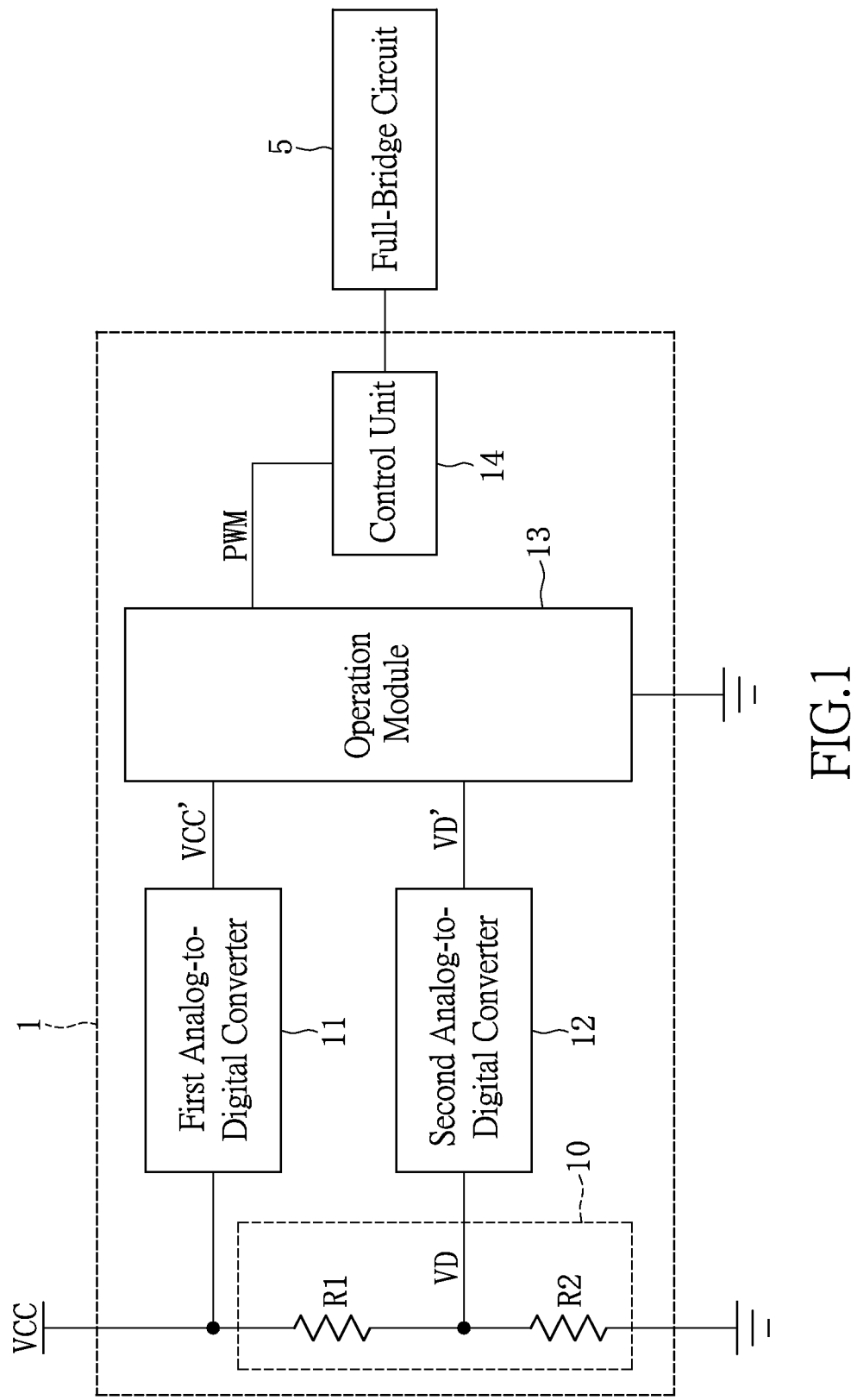
FIG. 1 is a block diagram of a motor speed control circuit according to one embodiment of the present invention.

With reference to FIG. 1, FIG. 1 is a block diagram of a motor speed control circuit according to one embodiment of the present invention. The motor speed control circuit 1 includes a voltage-dividing module 10, a first analog-to-digital converter 11, a second analog-to-digital converter 12, an operation module 13 and a control unit 14. The voltage-dividing module 10 is coupled to the second analog-to-digital converter 12. The operation module 13 is coupled to the first analog-to-digital converter 11 and the second analog-to-digital converter 12. The control unit 14 is coupled to the operation module 13.

Furthermore, the voltage-dividing module 10 includes a first resistor unit R1 and a second resistor unit R2. A first terminal of the first resistor unit R1 is coupled to a supply voltage source (not shown in FIG. 1) to receive a supply voltage VCC. A first terminal of the second resistor unit is coupled to a second terminal of the first resistor unit R1. A second terminal of the second resistor unit R2 is coupled to the grounding terminal.

The first resistor unit R1 and the second resistor unit R2 include respectively at least one resistor. It should be noted that even though only one resistor is shown in the first resistor unit R1 and the second resistor unit R2 in FIG. 1, the present invention, however, is not limited to the number of the resistors in the first resistor unit R1 and the second resistor unit R2. In another embodiment, the first resistor unit R1 and the second resistor unit R2 may include respectively a plurality of resistors. The person with ordinary skill in the art may make any modifications on the first resistor unit R1 and the second resistor unit R2 according to practical demand.

The first analog-to-digital converter 11 is coupled to a first terminal of the first resistor unit R1. The first analog-to-digital converter 11 includes logic and/or coding circuitry for receiving the supply voltage VCC and converting the supply voltage VCC into a digital supply voltage VCC'.

The second analog-to-digital converter 12 is coupled to a first terminal of the second resistor unit R2. The second analog-to-digital converter 12 includes logic and/or coding circuitry for receiving a divided voltage VD generated by the voltage-dividing module 10 and converting the divided voltage VD into a digital divided voltage VD'. The divided voltage VD is associated with a resistance ratio between the first resistor unit R1 and the second resistor unit R2.

The operation module 13 includes logic and/or coding circuitry for receiving the digital divided voltage VCC' and determining a motor speed curve according to the resistance ratio between the first resistor unit R1 and the second resistor unit R2. The operation module 13 generates a pulse width modulation signal PWM according to the motor speed curve and the digital supply voltage VCC' to drive the motor. The motor speed curve is associated with the supply voltage VCC and a rotational speed of the motor.

Furthermore, the operation module 13 stores a plurality of motor speed curves. Each of the motor speed curves has a different slope and characteristics. The slope of each of the motor speed curves is associated with the resistance ratio between the first resistor unit R1 and the second resistor unit R2. According to the resistance ratio between the first resistor unit R1 and the second resistor unit R2, the operation module 13 selects one motor speed curve from the plurality of motor speed curves.

It should be noted that the operation module 13 determines the motor speed curve according to the resistance ratio between the first resistor unit R1 and the second resistor unit R2. The supply voltage VCC does not affect the operation module 13 in determining which motor speed curve to select.

The resistance ratio between the first resistor unit R1 and the second resistor unit R2 may be determined by the manufacturer. Alternatively, at least one of the first resistor unit R1 and the second resistor unit R2 may include a variable resistor so that the resistances of the first resistor unit R1 and the second resistor unit R2 may be changed according to practical demand.

Once the motor speed curve is determined, the operation module 13 calculates a corresponding rotational speed according to the equation of the motor speed curve and the digital supply voltage VCC', and generates a pulse width modulation signal PWM according to the calculated rotational speed. Otherwise, the operation module 13 may store in advance a look-up table associated with the rotational speed and the supply voltage on each of the motor speed curves in a storage unit (not shown in FIG. 1). When the operation module 13 receives the digital supply voltage VCC', a corresponding rotational speed may be acquired from the look-up table to generate a pulse width modulation signal PWM to drive the motor to rotate.

It should also be noted that the operation module 13 receives the digital supply voltage VCC' when the rotor in the motor operates at a phase-switching point (i.e., the dead zone) so as to prevent the digital supply voltage VCC' from being affected by the noise generated when the motor operates during phase-switching. Accordingly, the pulse width modulation signal PWM generated by the operation module 13 is prevented from being affected.

The control unit 14 includes logic and/or coding circuitry for receiving the pulse width modulation signal PWM and a timing signal outputted by the Hall-effect sensor (not shown in FIG. 1). The control unit 14 generates a plurality of control signals according to the pulse width modulation signal PWM. The control signals are used for controlling the full-bridge circuit 5 associated with the rotation of the motor.

The full-bridge circuit 5 includes logic and/or coding circuitry for controlling the voltage supplied to the rotor in the motor. For example, the full-bridge circuit 5 includes four transistors. The first transistor and the second transistor are coupled to the supply voltage source to receive the supply voltage VDD. The third transistor and the fourth transistor are coupled to the grounding terminal. The gates of the first, the second, the third and the fourth transistors are respectively coupled to the control unit 14. By controlling the first, the second, the third and the fourth transistors to be turned on, the control unit 14 can properly increase or decrease the voltage supplied to the rotor in the motor to further control the rotational speed of the motor.

It should also be noted that it is known to the person with ordinary in the art to use the Hall-effect sensor to detect the magnetic pole positions of the internal magnetic poles of the rotor in the motor to generate a timing signal. Descriptions thereof are thus not repeated herein.

Figure 2:
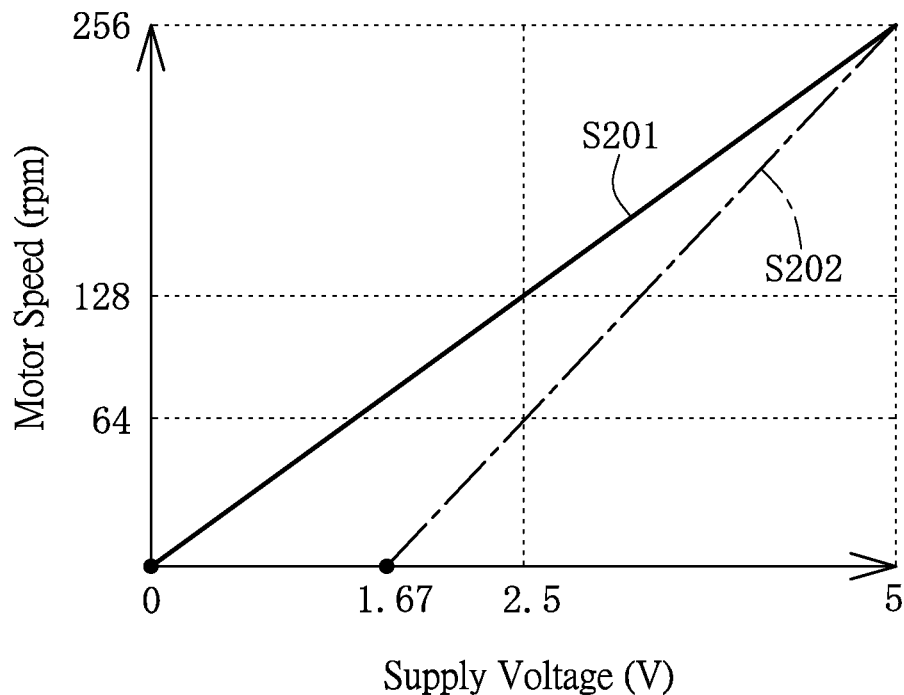
FIG. 2 is a graph showing motor speed curves according to one embodiment of the present invention.

To make the present invention clearer, an example is provided herein. With reference to FIG. 2, FIG. 2 is a graph showing motor speed curves according to one embodiment of the present invention. In FIG. 2, the transverse axis represents the supply voltage (V) supplied to the motor speed control circuit 1, and the longitudinal axis represents the rotational speed (revolution per minute, rpm) of the motor. In FIG. 2, two motor speed curves are provided. The curve S201 represents the motor speed curve corresponding to a conventional motor, and the curve S202 represents the motor speed curve corresponding to the motor according to the present invention. It should be noted that the difference between the conventional motor and the motor according to the present invention is that the motor according to the present invention adjusts the rotational speed of the motor by the motor speed control circuit 1.

In the present embodiment, it is assumed that the highest supply voltage VCC is 5V. The resistance ratio between the first resistor unit R1 and the second resistor unit R2 is 1:2. The first analog-to-digital converter 11 and the second analog-to-digital converter 12 are 8-bit analog-to-digital converters. To make it more easily understood, in one embodiment of the present invention, the longitudinal axis is divided into $2^8$ scales (i.e., 256 scales). The 256th scale indicates that the motor operates at its maximal rotational speed (for example, 6000 rpm).

In the conventional motor, after the supply voltage VCC starts to be provided, the control unit of the conventional motor outputs a pulse width modulation signal with 100% duty cycle so that the conventional motor starts to operate according to the curve S201.

In the motor according to one embodiment of the present invention, after the supply voltage VCC starts to be provided, the first analog-to-digital converter 11 receives the supply voltage VCC and generates a digital supply voltage VCC', the voltage-dividing module 10 divides the supply voltage VCC according to the voltage dividing rule and outputs a divided voltage VD. Then, the second analog-to-digital converter 12 receives the divided voltage VD and generates a digital divided voltage VD'.

According to the digital divided voltage VD', the operation module 13 determines that the resistance ratio between the first resistor unit R1 and the second resistor unit R2 is 1:2 and selects a motor speed curve with respect to the curve S202. The threshold value of the curve S202 on the transverse axis is about 1.67 (i.e., 5*(1/1+2)). In other words, the motor speed control circuit 1 drives the motor to rotate when the supply voltage VCC exceeds 1.67 V.

Then, the operation module 13 drives the motor according to the digital supply voltage VCC'. For example, when the digital supply voltage VCC' is 2.5 V, the curve 201 corresponds to the 128th scale on the longitudinal axis (the corresponding rotational speed is 3000 rpm), and the curve 202 corresponds to the 64th scale on the longitudinal axis (the corresponding rotational speed is 1500 rpm). Accordingly, the operation module 13 determines that the duty cycle of the pulse width modulation signal for the curve 202 is half the duty cycle of the pulse width modulation signal for the curve 201. Since the duty cycle of the pulse width modulation signal corresponding to the curve S201 is 100%, the operation module 13 generates a pulse width modulation signal PWM with 50% duty cycle. The control unit 14 further drives the motor according to the pulse width modulation signal PWM so that the motor operates according to the curve S202.

Figure 3:
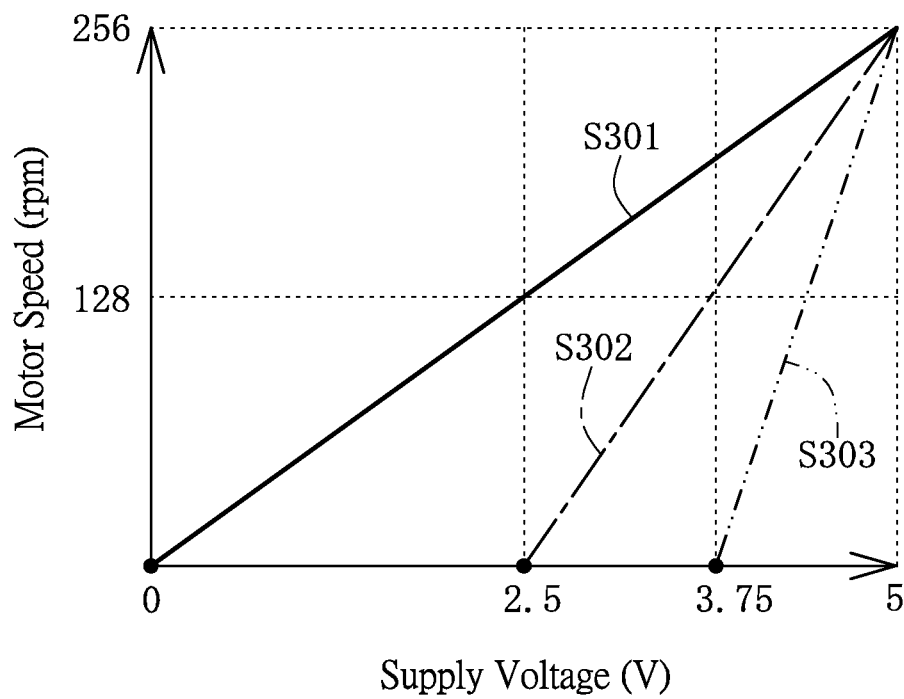
FIG. 3 is a graph showing motor speed curves according to another embodiment of the present invention.

With reference to FIG. 3, FIG. 3 is a graph showing motor speed curves according to another embodiment of the present invention. In FIG. 3, the transverse axis represents the supply voltage (V) supplied to the motor speed control circuit 1, and the longitudinal axis represents the rotational speed (rpm) of the motor. Similar to the curve S201 in FIG. 2, the curve S301 represents the motor speed curve corresponding to a conventional motor. FIG. 3 is different from the curve S202 in FIG. 2 in that the curve S302 in FIG. 3 corresponds to the resistance ratio between the first resistor unit R1 and the second resistor unit R2 being 1:1 and the curve S303 corresponds to the resistance ratio between the first resistor unit R1 and the second resistor unit R2 being 2:1.

In FIG. 2 and FIG. 3, the operation module 13 selects different motor speed curves according to the change in the resistance ratio between the first resistor unit R1 and the second resistor unit R2. The motor speed curves have different slopes and characteristics, and the slope of each of the motor speed curves is associated with the resistance ratio between the first resistor unit R1 and the second resistor unit R2. However, no matter which one of the motor speed curves the operation module 13 selects, the motor operates at its maximal rotational speed (for example, 6000 rpm) when the supply voltage VCC is 5V. In other words, the motor is prevented from being affected by the variation of the motor speed curves when the motor operates at its maximal rotational speed.

In one embodiment of the present invention, the motor speed control circuit 1 is characterized in that the operation module 13 does not change the selected motor speed curve as long as the resistance ratio between the first resistor unit R1 and the second resistor unit R2 remains unchanged. In other words, the operation module 13 does not select another motor speed curve even though the supply voltage VCC changes.

It should also be noted that the operation module 13 stores a plurality of motor speed curves when the resistance ratio between the first resistor unit R1 and the second resistor unit R2 is not fixed. When the resistance ratio between the first resistor unit R1 and the second resistor unit R2 is fixed, the operation module 13 only stores a motor speed curve corresponding to the resistance ratio.

Figure 4:
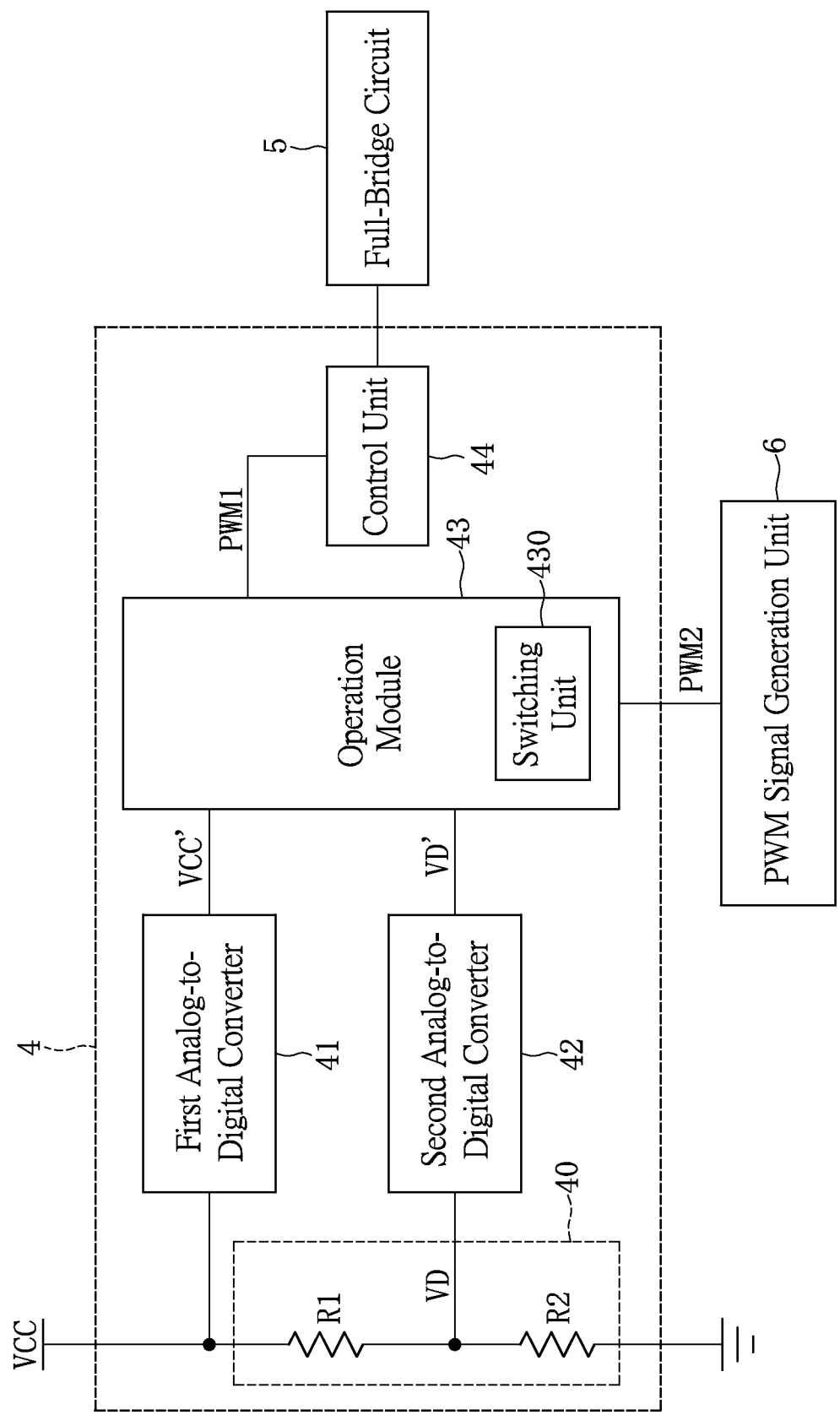
FIG. 4 is a block diagram of a motor speed control circuit according to another embodiment of the present invention.

With reference to FIG. 4, FIG. 4 is a block diagram of a motor speed control circuit according to another embodiment of the present invention. Similar to the motor speed control circuit 1 in FIG. 1, the motor speed control circuit 4 in FIG. 4 includes a voltage-dividing module 40, a first analog-to-digital converter 41, a second analog-to-digital converter 42, an operation module 43 and a control unit 44. The configuration and the functions of the motor speed control circuit 4 are similar to those of the motor speed control circuit 1, and thus descriptions thereof are not repeated herein. Only the differences between the motor speed control circuit 4 and the motor speed control circuit 1 are described herein.

Unlike the motor speed control circuit 1, the operation module 43 of the motor speed control circuit 4 is further coupled to a pulse width modulation signal generation unit 6. The pulse width modulation signal generation unit 6 includes logic and/or coding circuitry for generating an input pulse width modulation signal PWM2. The switching unit 430 of the operation module 43 switches the operation module 43 to a pulse width driven (PW-driven) mode or a voltage-driven mode according to a logic level of the input pulse width modulation signal PWM2.

When the voltage of the input pulse width modulation signal PWM2 at a high logic level is higher than the first threshold voltage V1 and the voltage of the input pulse width modulation signal PWM2 at a low logic level is lower than the second threshold voltage V2, the switching unit 430 switches the operation module 43 to the PW-driven mode. Then, the motor speed control circuit 4 drives the motor to rotate according to the input pulse width modulation signal PWM2.

Figure 5A:
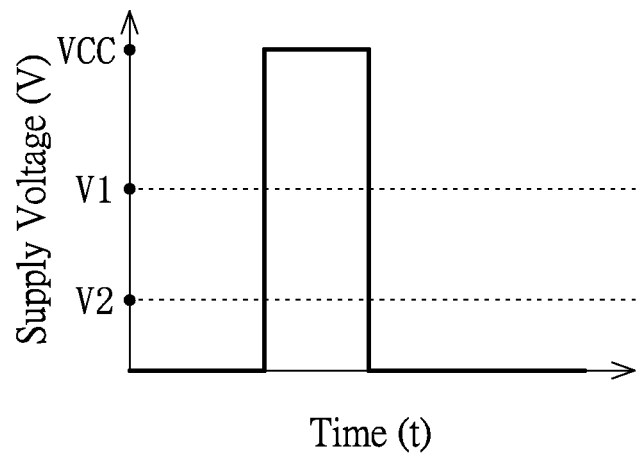
FIG. 5A~5C are schematic diagrams of pulse width modulation signals when a motor speed control circuit operates in a PW-driven mode according to one embodiment of the present invention.
Figure 5B:
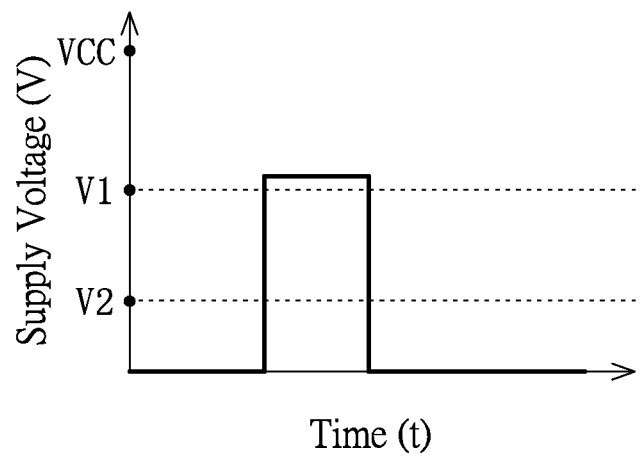
Figure 5C:
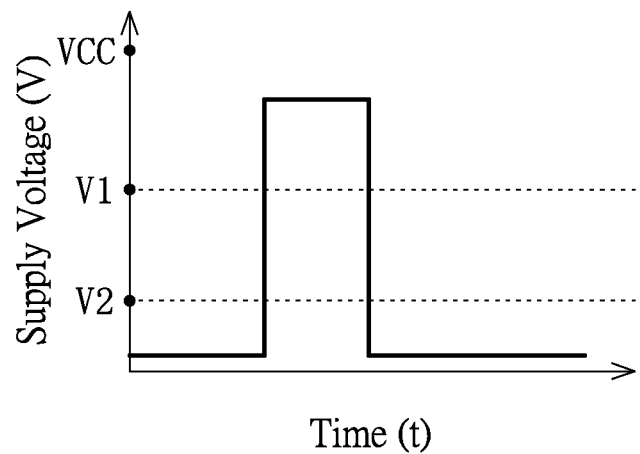

With reference to FIG. 4 and FIG. 5A~5C, FIG. 5A~5C are schematic diagrams of pulse width modulation signals when a motor speed control circuit operates in a PW-driven mode according to one embodiment of the present invention. In FIG. 5A~5C, the transverse axis represents time (t), the waveform represents the input pulse width modulation signal PWM2, and the longitudinal axis represents the supply voltage (V) supplied to the motor speed control circuit 4.

The operation module 43 determines whether the input pulse width modulation signal PWM2 is at a high logic level according to the threshold voltage V1, and determines whether the input pulse width modulation signal PWM2 is at a low logic level according to the second threshold voltage V2.

In FIG. 5A~5C, the voltage of the input pulse width modulation signal PWM2 at a high logic level is higher than the first threshold voltage V1, and the voltage of the input pulse width modulation signal PWM2 at a low logic level is lower than the second threshold voltage V2. Therefore, the switching unit 430 switches the operation module 43 to the PW-driven mode.

When the operation module 43 operates in the PW-driven mode, the operation module 43 outputs the input pulse width modulation signal PWM2 to the control unit 44 so that the control unit 44 drives the motor according to the input pulse width modulation signal PWM2.

It should be noted that the first threshold voltage V1 is set to be 50% of the supply voltage VCC, and the second threshold voltage V2 is set to be 16% of the supply voltage VCC. However, the present invention is not limited thereto. In another embodiment, the first threshold voltage V1 and the second threshold voltage V2 may be designed according to practical demand.

Figure 6:
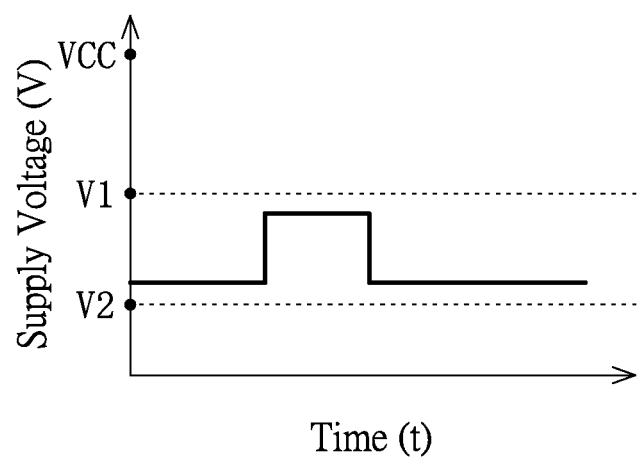
FIG. 6 is a schematic diagram of a pulse width modulation signal when a motor speed control circuit operates in a voltage-driven mode according to one embodiment of the present invention.

With reference to FIG. 4 and FIG. 6, FIG. 6 is a schematic diagram of a pulse width modulation signal when a motor speed control circuit operates in a voltage-driven mode according to one embodiment of the present invention. In FIG. 6, the transverse axis represents time (t), the waveform represents the input pulse width modulation signal PWM2, and the longitudinal axis represents the supply voltage (V) supplied to the motor speed control circuit 4.

In FIG. 6, the voltage of the input pulse width modulation signal PWM2 at a high logic level is lower than the first threshold voltage V1, and the voltage of the input pulse width modulation signal PWM2 at a low logic level is higher than the second threshold voltage V2.

When the input pulse width modulation signal PWM2 conforms to the waveform in FIG. 6, the operation module 43 fails to correctly determine the logic level of the input pulse width modulation signal PWM2. Therefore, the operation module 43 fails to determine the duty cycle of the input pulse width modulation signal PWM2.

Therefore, when the voltage of the input pulse width modulation signal PWM2 at a high logic level is lower than the first threshold voltage V1 and the voltage of the input pulse width modulation signal PWM2 at a low logic level is higher than the second threshold voltage V2, the switching unit 430 switches the operation module 43 to the voltage-driven mode. Meanwhile, the operation module 43 drives the motor according to the supply voltage VCC. In other words, when the operation module 43 fails to determine whether the input pulse width modulation signal PWM2 switches between high and low, the user determines the operation module 43 to operate in the voltage-driven mode.

When the operation module 43 operates in the voltage-driven mode, the operation module 43 receives the digital supply voltage VCC' outputted by the first analog-to-digital converter 41 and the digital divided voltage VD' outputted by the second analog-to-digital converter 42, and determines a motor speed curve according to the resistance ratio between the first resistor unit R1 and the second resistor unit R2 of the voltage-dividing module.

After the motor speed curve is determined, the operation module 43 calculates a corresponding rotational speed according to an equation corresponding to the motor speed curve and the digital supply voltage VCC', and generates a first pulse width modulation signal PWM1 according to calculated rotational speed. The control unit 44 receives the first pulse width modulation signal PWM1, and generates a control signal according to the first pulse width modulation signal PWM1 to control the full-bridge circuit 5 associated with the rotation of the motor.

According to the above, the motor speed control circuit 4 according to the present invention may operate in different modes under different conditions. When the motor speed control circuit 4 operates in the PW-driven mode, the motor speed control circuit 4 drives the motor to rotate according to the input pulse width modulation signal PWM2. When the motor speed control circuit 4 operates in the voltage-driven mode, the motor speed control circuit 4 drives the motor to rotate according to the supply voltage VCC. As a result, the motor speed control circuit 4 controls the motor to operate normally no matter how the logic level of the input pulse width modulation signal PWM2 changes.

Figure 7:
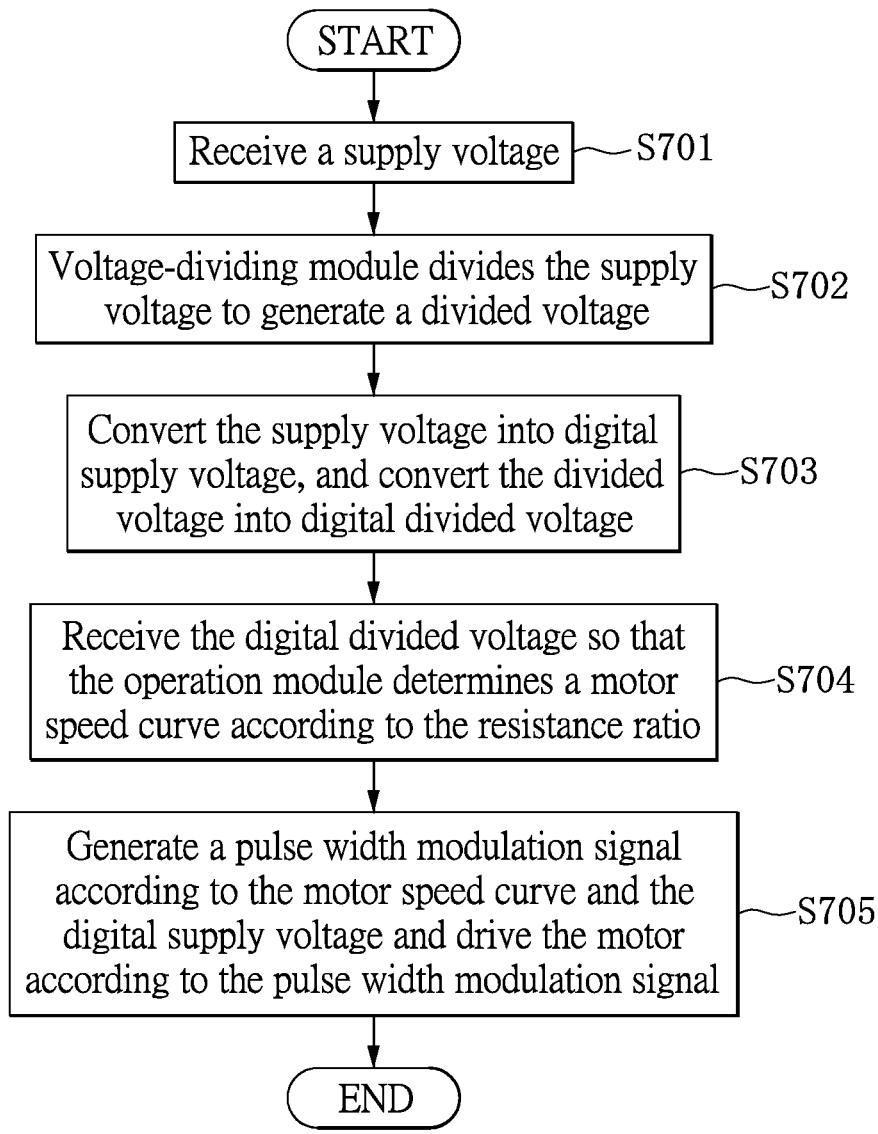
FIG. 7 is a flowchart of a control method according to one embodiment of the present invention.

With reference to FIG. 7, FIG. 7 is a flowchart of a control method according to one embodiment of the present invention. The control method in FIG. 7 is suitable for use with the motor speed control circuit 1 and 4. In Step S701, a supply voltage is received from a supply voltage source. In Step S702, the voltage-dividing module divides the supply voltage to generate a divided voltage. The voltage-dividing module includes a first resistor unit and a second resistor unit. The divided voltage is associated with a resistance ratio between a first resistor unit and a second resistor unit of the voltage-dividing module.

In Step S703, the first analog-to-digital converter converts the supply voltage into a digital supply voltage, and the second analog-to-digital converter converts the divided voltage into a digital divided voltage. In Step S704, the operation module receives the digital divided voltage, and determines a motor speed curve according to the resistance ratio between the first resistor unit and the second resistor unit. In Step S705, the operation module generates a pulse width modulation signal according to the motor speed curve and the digital supply voltage, and outputs the pulse width modulation signal to the control unit. The control unit controls the full-bridge circuit according to the pulse width modulation signal to drive the motor.

Figure 8:
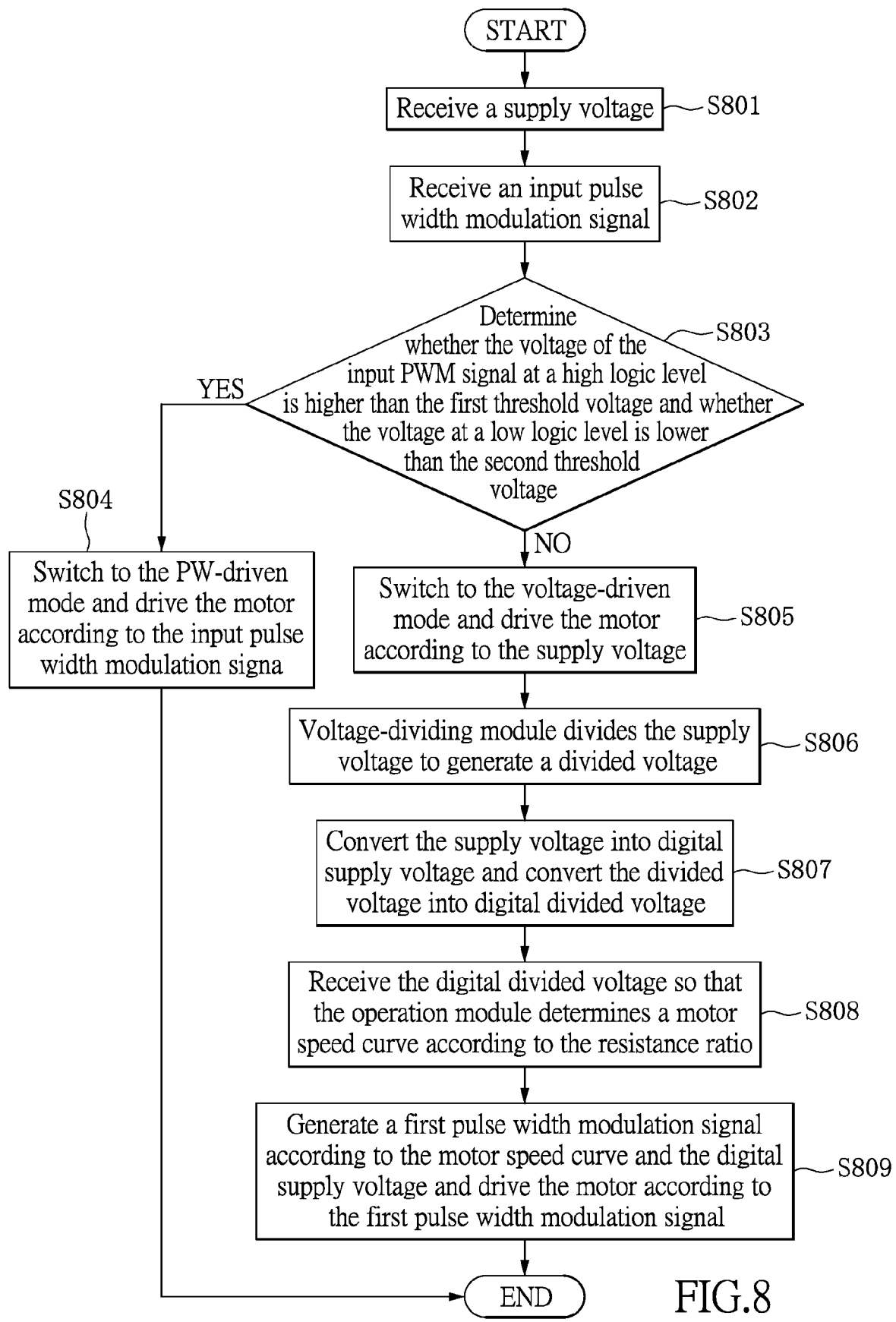
FIG. 8 is a flowchart of a control method according to another embodiment of the present invention.

With reference to FIG. 8, FIG. 8 is a flowchart of a control method according to another embodiment of the present invention. The control method in FIG. 8 is suitable for use with the motor speed control circuit 4. In Step S801, a supply voltage is received from a supply voltage source. In Step S802, an input pulse width modulation signal is received from a pulse width modulation signal generation unit. In Step S803, the operation module determines whether the voltage of the input pulse width modulation signal at a high logic level is higher than the first threshold voltage, and whether the voltage at a low logic level is lower than the second threshold voltage. When the voltage of the input pulse width modulation signal at a high logic level is higher than the first threshold voltage and the voltage of the input pulse width modulation signal at a low logic level is lower than the second threshold voltage, the method proceeds to Step S804. When the voltage of the input pulse width modulation signal at a high logic level is lower than the first threshold voltage or the voltage of the input pulse width modulation signal at a low logic level is higher than the second threshold voltage, the method proceeds to Step S805.

In Step S804, the operation module switches to the PW-driven mode and drives the motor to rotate according to the input pulse width modulation signal. In Step S805, the operation module switches to the voltage-driven mode and drives the motor to rotate according to the supply voltage.

In Step S806, the voltage-dividing module divides the supply voltage to generate a divided voltage. The voltage-dividing module includes a first resistor unit and a second resistor unit. The divided voltage is associated with a resistance ratio between a first resistor unit and a second resistor unit of the voltage-dividing module.

In Step S807, the first analog-to-digital converter converts the supply voltage into a digital supply voltage, and the second analog-to-digital converter converts the divided voltage into a digital divided voltage.

In Step S808, the operation module receives the digital divided voltage and determines a motor speed curve according to the resistance ratio between the first resistor unit and the second resistor unit. In Step S809, the operation module generates a first pulse width modulation signal according to the motor speed curve and the digital supply voltage and outputs the first pulse width modulation signal to the control unit. The control unit controls the full-bridge circuit according to the first pulse width modulation signal to drive the motor.

As stated above, one embodiment of the present invention provides a motor speed control circuit and a control method thereof, capable of selecting from motor speed curves according to practical demand and adjusting a rotational speed of a motor according to the selected motor speed curve. Moreover, the motor speed control circuit of the present invention using digital calculations outperforms the conventional motor control circuit using analog calculations to control the motor more precisely.

One embodiment of the present invention provides a motor speed control circuit capable of operating in two modes. The motor speed control circuit may drive the motor according to a pulse width modulation signal outputted by other devices. When the motor speed control circuit fails to receive the pulse width modulation signal or the motor speed control circuit fails to determine the logic level of the pulse width modulation signal, the motor speed control circuit may drive the motor according to the voltage supplied to the motor speed control circuit.

The above-mentioned descriptions represent merely the exemplary embodiment of the present disclosure, without any intention to limit the scope of the present disclosure thereto. Various equivalent changes, alterations or modifications based on the claims of the present disclosure are all consequently viewed as being embraced by the scope of the present disclosure.

What is claimed is:
1. A motor speed control circuit, comprising:
   a voltage-dividing module, comprising a first resistor unit and a second resistor unit, wherein a first terminal of said first resistor unit receives a supply voltage, a first terminal of said second resistor unit is coupled to a second terminal of said first resistor unit;
   a first analog-to-digital converter, coupled to a first terminal of said first resistor unit, for receiving said supply voltage, and converting said supply voltage into a digital supply voltage;
   a second analog-to-digital converter, coupled to a first terminal of said second resistor unit, for receiving a divided voltage generated by said voltage-dividing module, and converting said divided voltage into a digital divided voltage, wherein said divided voltage is associated with a resistance ratio between said first resistor unit and said second resistor unit; and
   an operation module, coupled to said first analog-to-digital converter and said second analog-to-digital converter, said operation module receiving said digital divided voltage and determining a motor speed curve according to said resistance ratio, said operation module generating a first pulse width modulation signal according to said motor speed curve and said digital supply voltage to drive a motor, wherein said motor speed curve is associated with said supply voltage and a rotational speed of said motor;
   wherein said operation module selects one from a plurality of motor speed curves according to said resistance ratio, and said operation module calculates said rotational speed according to an equation corresponding to said one from said plurality of motor speed curves, wherein said motor speed curves have different slopes associated with said resistance ratio;
   wherein said operation module is further coupled to a pulse width modulation signal generation unit, said pulse width modulation signal generation unit outputs an input pulse width modulation signal to said operation module, wherein a switching unit of said operation module switches said operation module to a pulse width driven (PW-driven) mode or a voltage-driven mode according to a logic level of said input pulse width modulation signal.

2. The motor speed control circuit of claim 1, wherein said motor speed control circuit further comprises:
   a control unit, coupled to said operation module, for generating a plurality of control signals according to said first pulse width modulation signal, wherein said control signals are used to control a full-bridge circuit.

3. The motor speed control circuit of claim 1, wherein said switching unit switches said operation module to said PW-driven mode and said motor speed control circuit drives said motor to rotate according to said input pulse width modulation signal when a voltage of said input pulse width modulation signal at a high logic level is higher than a first threshold voltage and a voltage of said input pulse width modulation signal at a low logic level is lower than a second threshold voltage.

4. The motor speed control circuit of claim 1, wherein said switching unit switches said operation module to said voltage-driven mode and said motor speed control circuit drives said motor to rotate according to said supply voltage when a voltage of said input pulse width modulation signal at a high logic level is lower than a first threshold voltage and a voltage of said input pulse width modulation signal at a low logic level is higher than a second threshold voltage.

5. The motor speed control circuit of claim 3, wherein said first threshold voltage is 50% of said supply voltage and said second threshold voltage is 16% of said supply voltage.

6. A control method for a motor speed control circuit for adjusting a motor speed, said motor speed control circuit comprising a voltage-dividing module, a first analog-to-digital converter, a second analog-to-digital converter and an operation module, said control method comprising:
   Step A: receiving a supply voltage;
   Step B: dividing, by said voltage-dividing module, said supply voltage to generate a divided voltage, wherein said divided voltage is associated with a resistance ratio between a first resistor unit and a second resistor unit of said voltage-dividing module;
   Step C: converting said supply voltage into a digital supply voltage and said divided voltage into a digital divided voltage;
   Step D: receiving said digital divided voltage so that said operation module selects one from a plurality of motor speed curves according to said resistance ratio and calculates a corresponding rotational speed according to an equation corresponding to said one from said plurality of motor speed curves, wherein said motor speed curves have different slopes associated with said resistance ratio;
   Step E: generating a first pulse width modulation signal according to said motor speed curve and said digital supply voltage to drive a motor, wherein said motor speed curve is associated with said supply voltage and said rotational speed of said motor;
   wherein Step A further comprises:
   Step A1: receiving an input pulse width modulation signal, and switching said operation module to a PW-driven mode or a voltage-driven mode according to a logic level of said input pulse width modulation signal.

7. The control method of claim 6, wherein said method further comprises:
   Step F: generating a plurality of control signals according to said first pulse width modulation signal to control a full-bridge circuit.

8. The control method of claim 6, wherein Step A further comprises:
   Step A2: switching said operation module to said PW-driven mode and driving said motor to rotate according to said input pulse width modulation signal when a voltage of said input pulse width modulation signal at a high logic level is higher than a first threshold voltage and a voltage of said input pulse width modulation signal at a low logic level is lower than a second threshold voltage.

9. The control method of claim 6, wherein Step A further comprises:
   Step A3: switching said operation module to said voltage-driven mode and driving said motor to rotate according to said supply voltage when a voltage of said input pulse width modulation signal at a high logic level is lower than a first threshold voltage and a voltage of said input pulse width modulation signal at a low logic level is higher than a second threshold voltage.

10. The control method of claim 8, wherein said first threshold voltage is 50% of said supply voltage and said second threshold voltage is 16% of said supply voltage.

* * * * *